United States Patent [19]

Crossman

[11] Patent Number: 4,474,060
[45] Date of Patent: Oct. 2, 1984

[54] TORQUE READOUT SENSOR

[75] Inventor: Richard L. Crossman, Tallmadge, Ohio

[73] Assignee: Goodyear Aerospace Corporation, Akron, Ohio

[21] Appl. No.: 397,269

[22] Filed: Jul. 12, 1982

[51] Int. Cl.³ .............................................. G01L 5/28
[52] U.S. Cl. ................................ 73/129; 73/862.08; 73/862.54; 188/181 T
[58] Field of Search .................. 73/129, 146, 862.54, 73/862.65, 862.19, 862.08; 188/2 A, 181 T; 303/112

[56] References Cited

U.S. PATENT DOCUMENTS

| | | | |
|---|---|---|---|
| 3,857,452 | 12/1974 | Hartman | 73/862.54 |
| 3,952,587 | 4/1976 | Goodhart | 73/862.54 |
| 4,043,607 | 8/1977 | Signorelli et al. | 303/112 |
| 4,129,202 | 12/1978 | Winters et al. | 188/181 T |
| 4,296,897 | 10/1981 | Thompson | 188/181 T |

Primary Examiner—Gerald Goldberg
Assistant Examiner—John E. Chapman, Jr.
Attorney, Agent, or Firm—P. E. Milliken; L. A. Germain

[57] ABSTRACT

A torque readout sensor for mounting to a bolted interconnection between an aircraft brake assembly and a brake reaction torque limiting apparatus to sense the reaction torque upon the application of braking action comprises a metal body that replaces a bushing at the bolted interconnection and configured such that a deflection of the body is accomplished in the direction of the reaction torque force and at least one pair of strain gauges are affixed to the body at the point of deflection to provide an output electrical signal calibrated to the amount of deflection and thus to the reaction torque experienced by the body.

14 Claims, 9 Drawing Figures

U.S. Patent   Oct. 2, 1984   Sheet 1 of 3   4,474,060
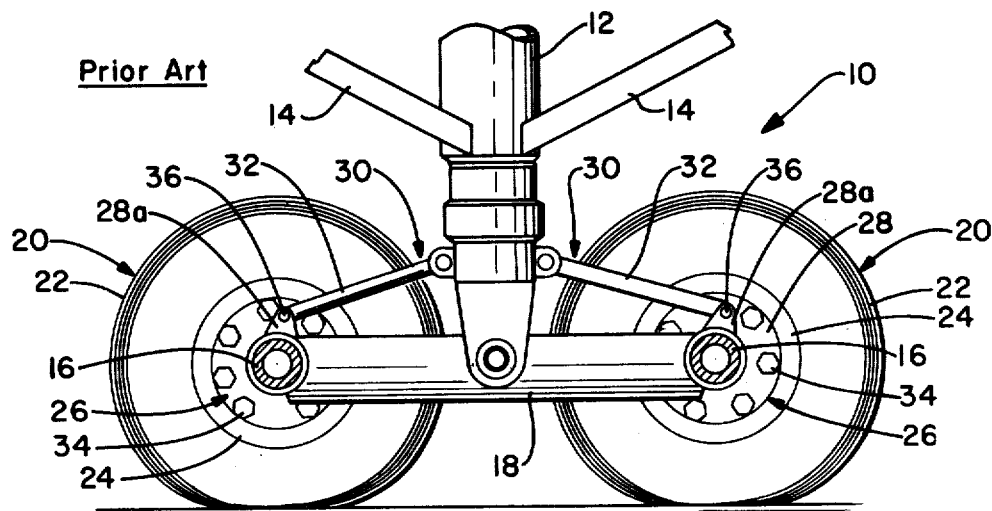
Prior Art
FIG.-1
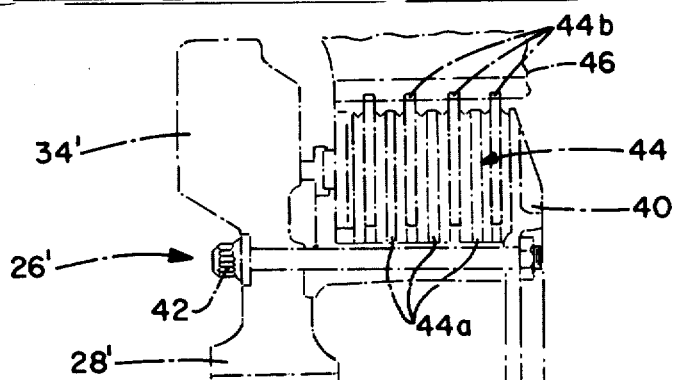
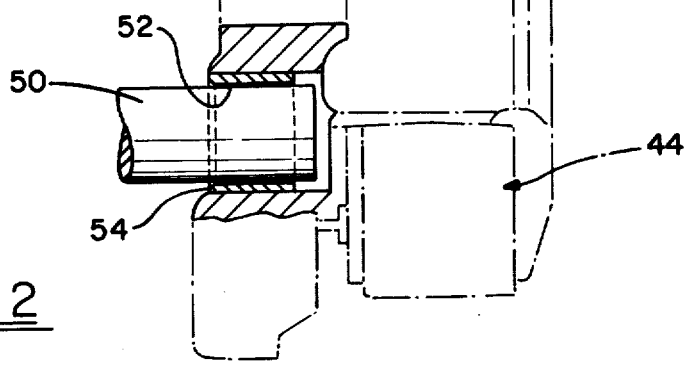
Prior Art
FIG.-2

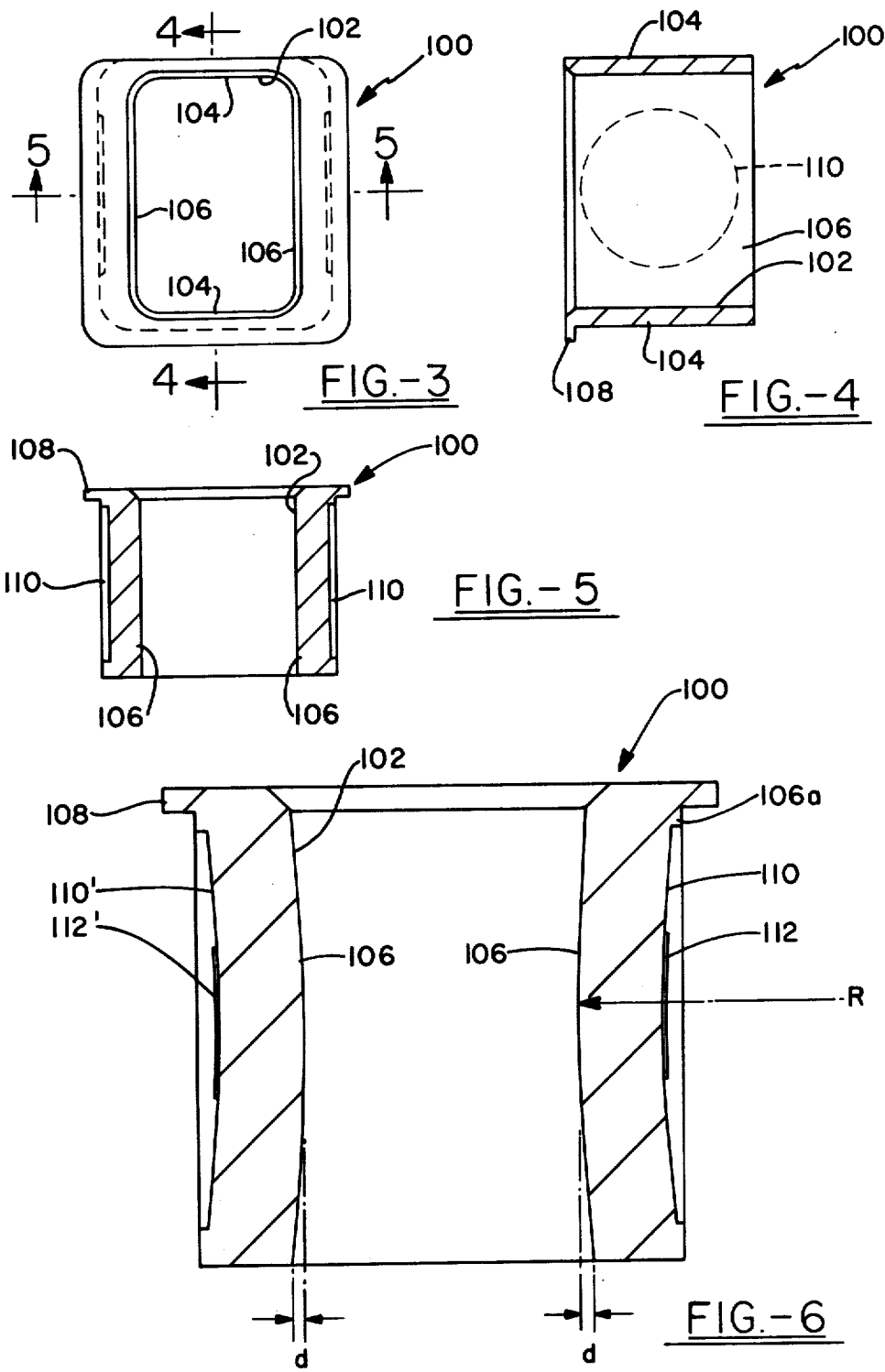

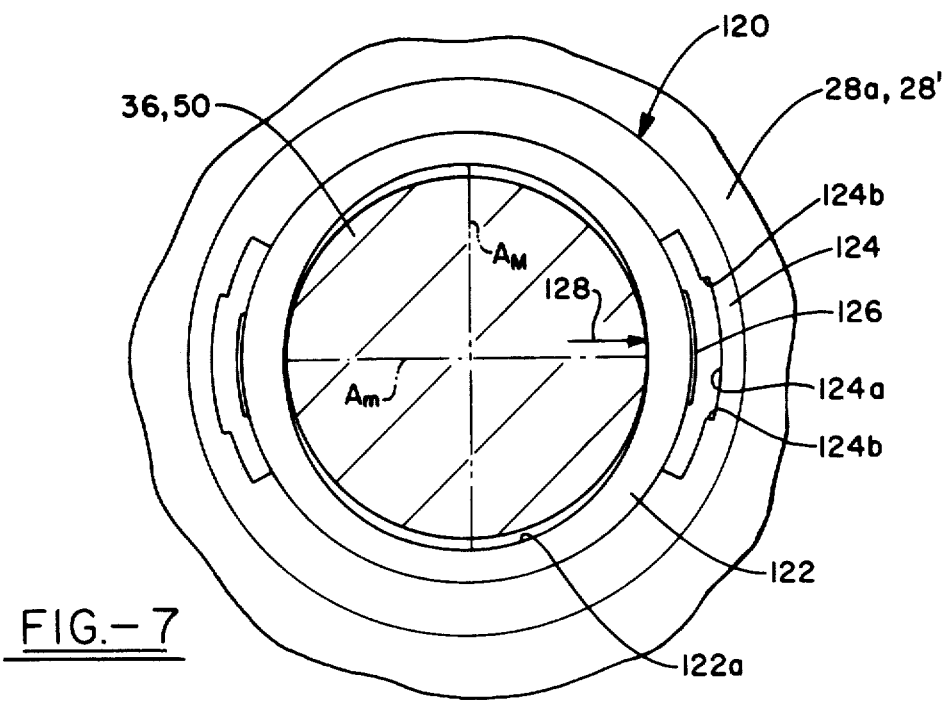
FIG.-7
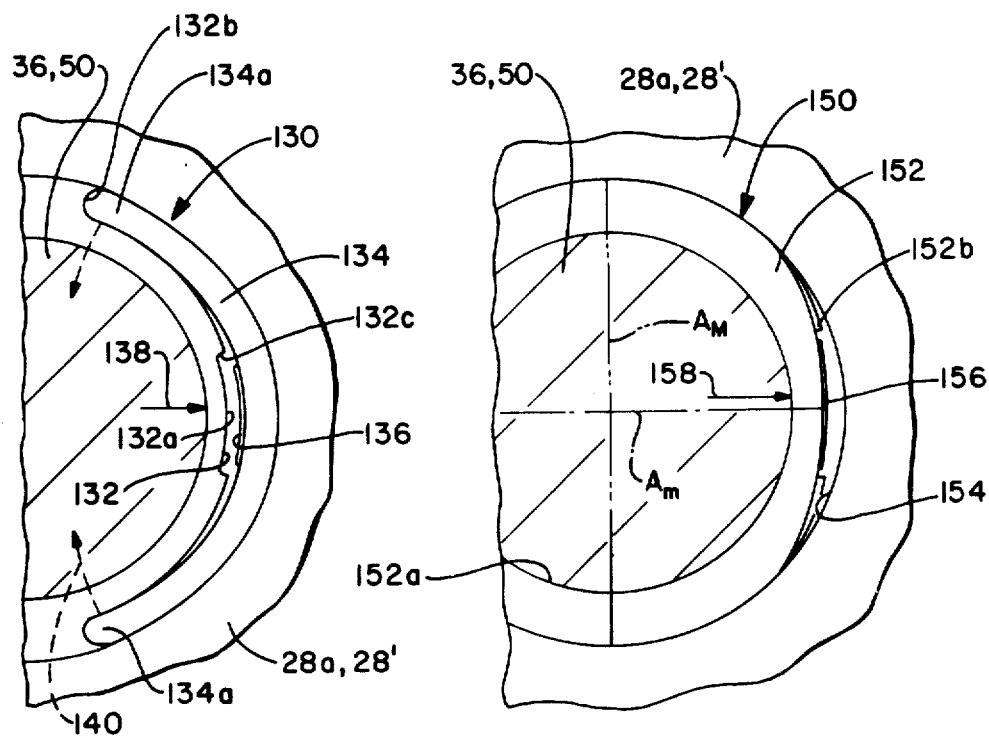
FIG.-8
FIG.-9

TORQUE READOUT SENSOR

BACKGROUND OF THE INVENTION

This invention generally relates to aircraft braking systems and more particularly to a unique sensor configuration which provides electrical signals indicative of wheel brake reaction torque.

Typically, aircraft brake systems include a multidisk stack of stationary and rotating elements which, when interacting in an axial direction, effect a frictional engagement and impart braking action to the wheel. Engagement of the disk elements is provided by a plurality of axially positioned actuators, each actuator acting on an annular portion of a brake pressure plate. The actuators are moved simultaneously by a force supplied by hydraulic fluid pressure in the well-known and understood manner. Brake engagement, of course, is initiated by the pilot operating a foot actuated valve which applies hydraulic fluid pressure to the brake actuators.

Many aircraft, both commercial and military, also employ antiskid systems to the braking of the aircraft. These systems are primarily electronic and generally their operation involves sensing aircraft deceleration to provide signals to a pressure control valve so as to release brake pressure. Deceleration is detected by a transducer mounted in the wheel to sense wheel speed and provide electrical signals to the antiskid control circuitry. These antiskid systems operate in conjunction with presently used hydraulic braking systems through servo valves and valve driver circuitry which function to operate the brake actuators in the manner described above.

In addition to the above-mentioned systems, there is a requirement to limit brake reaction torque generated in the normal braking operation so as to permit optimum stress design of aircraft structural elements and in particular, the aircraft landing gear strut assemblies. Brake reaction torque is controlled by limiting the fluid pressure input to the brake actuators. One example of accomplishing this is described in U.S. Pat. No. 4,296,897 issued Oct. 27, 1981 and assigned to The Boeing Company. According to this disclosure, a "brake torque limiter" functions to reduce the input pressure to the wheel brake mechanism after a comparison is made between the brake reaction torque and the input pressure. If the brake reaction torque is greater than a predetermined amount which has been designed as a function of fluid pressure input, then the brake torque limiter reduces the pressure input to the brake mechanism accordingly.

Presently, there is also a desire by aircraft manufacturers to reduce aircraft weight and in so doing, gain a decrease in fuel consumption and/or provide increased payload capacity. One area which possesses distinct possibilities for such weight reduction includes the hydraulic system for wheel brake actuation. Obviously, any hydraulic system requires lengths of hydraulic hose or tubing, pressure control devices such as valves and the like, and a source of hydraulic fluid. Elimination of the hydraulic system therefore can result in substantial weight savings. In a copending application entitled "Electrically Actuated Aircraft Brake" I have disclosed various alternatives to the hydraulic actuators. These are specially configured electric motor actuators which drive the brake disk elements into engagement in response to an electrical input signal.

While the elimination of the hydraulic brake actuation system is a distinct possibility in view of the advancements being made inthe art, such elimination presents a need for an electrical torque sensing means since torque sensing is now accomplished by reason of its relationship to hydraulic pressure. This hydraulic pressure relationship, however, is not an actual reading of the torque reaction force but rather is a relative measure of the torque force. A sensor that reads the actual torque force therefore is required. Furthermore, it is considered that antiskid systems may use brake reaction torque in a feedback loop of the system electronics to enhance antiskid control. In this circumstance, an electrical signal indicative of actual brake reaction torque will be extremely useful, not only to an all electrical brake actuation system but also to an electronic antiskid control system.

Therefore, and in accordance with one aspect of the present invention, it is an object to provide a torque readout sensor that is electrical by design and is capable of reading the actual brake reaction torque of any aircraft wheel and brake configuration.

It is in accordance with another aspect of the invention an object to provide a torque readout sensor that is compatible with future "brake-by-wire" aircraft braking systems and which may also provide signals usable by electronic antiskid systems.

It is in accordance with still another aspect of the invention an object to provide a torque readout sensor that is simple by design, easily mounted on an aircraft wheel and brake assembly during factory assembly operations thereof, and which may be retro-fitted in the field to presently designed wheel and brake assemblies.

It is in accordance with a further aspect of the invention an object to provide a configuration for a torque readout sensor that may be temperature compensated and calibrated upon factory installation and/or may be retrofitted in the field and no further maintenance calibrations are required.

SUMMARY OF THE INVENTION

The various aspects and objects of the invention are provided in a torque readout sensor for mounting to a bolted interconnection between an aircraft brake assembly and a means for limiting brake reaction torque generated upon the application of braking action comprising a metal body in the configuration of a sleeve to replace a bushing at the bolted interconnection and configured such that a deflection of the body in the direction of a torque force on the interconnection is sensed by at least one pair of strain gauges mounted or affixed to the body.

BRIEF DESCRIPTION OF THE DRAWINGS

FIG. 1 illustrates the environment of the invention as it may apply to a typical four-wheel bogie beam landing gear assembly for an aircraft, the two near-side wheels being broken away for the purpose of this description;

FIG. 2 is a sectional elevational view through a disk brake assembly forming a part of a two-wheel landing gear illustrating the application of the invention with the solid line portions being particularly pertinent;

FIG. 3 is an end view of one embodiment of the torque readout sensor comprising this invention;

FIG. 4 is an elevational view, in section, as may be taken on line 4—4 of FIG. 3;

FIG. 5 is an elevational view, in section, as may be taken on line 5—5 of FIG. 3;

FIG. 6 is a greatly enlarged sectional elevational view, similar to FIG. 5, of the torque sensor of FIG. 3;

FIG. 7 is an elevational view of another embodiment of the torque sensor as may be mounted on a circular-section torque bolt;

FIG. 8 is a partial elevational view of another embodiment of the invention similar to FIG. 7; and FIG. 9 is a partial elevational view of another embodiment as may be mounted on a circular-section torque bolt.

DETAILED DESCRIPTION OF THE INVENTION

Referring to the drawings, FIG. 1 illustrates the environment of the invention as it may apply to a typical four-wheel bogie beam landing gear generally indicated by reference numeral 10. The assembly of elements which comprise the landing gear 10 conventionally includes: a landing gear strut 12 connected to the aircraft structure (not shown) by various means and strut members 14; a pair of axles 16 mounted to the strut 12 by way of a bogie beam 18; wheel, brake, and tire assemblies generally indicated at 20; and brake torque controlling means generally indicated at 30.

Each assembly 20 comprises a tire 22 mounted on a wheel 24 having axially positioned brake means 26 mounted therein. The brake means 26 conventionally includes a brake disk stack comprised of a series of disks keyed to the wheel for rotation therewith and a second series of alternating disks keyed to a torque tube member that is stationarily mounted to a brake housing indicated at 28. The brake housing 28 carries a plurality of brake actuators 34 that are mounted in spaced positions about the housing to effect compression of the brake stack in the well-known and understood manner. When the brake means 26 are not affixed directly and in a stationary manner to the axle 16, brake reaction torque generated by braking action of the rotating disks is taken up through torque controlling means 30. The torque controlling means 30 comprises a torque takeout arm 32 connected at one of its ends to the strut and at the opposite end to the brake housing 28 by way of a housing flange member 28a. Connection of the torque takeout arm 32 to the flange 28a is accomplished by means of a bolt 36.

FIG. 2 illustrates a brake assembly 26' as it may be configured for a typical two-wheel landing gear. The brake assembly 26' comprises a brake housing 28' that carries a plurality of brake actuators 34' radially positioned within the housing about the axle 16 in a manner similar to that illustrated in FIG. 1. Extending axially from the housing 28' is a torque tube 40 that is mounted to the housing 28' via bolts 42. A plurality of brake disks forming a brake disk stack 44 are carried by the torque tube 40, one series of disks 44a being keyed to the torque tube 40 while an alternating series of disks 44b are keyed to the wheel 46 for rotation therewith. Brake reaction torque is controlled through an interconnection of a torque takeout stud bolt 50 with the brake housing 28'. The bolt 50 is, of course, mounted to the aircraft strut assembly to effect torque takeout in much the same manner as the arm 32 in FIG. 1. A bushing or the like 54 is mounted in the bolt receiving bore 52 to protect the housing 28' which is comprised of forged aluminum.

Now therefore, this invention is directed to a torque readout sensor that directly senses the brake reaction torque experienced by the torque takeout elements described with respect to FIGS. 1 and 2. The torque sensor of this invention is adapted for mounting at the interconnection of the torque controlling means associated with the landing gear strut. In FIG. 1 the interconnection is at the bolt 36 that connects the torque takeout arm 32 to the brake housing flange 28a. In FIG. 2 the interconnection is at the stud bolt 50 that connects into the housing 28'. The torque takeout bolts 36,50 may be of any cross-sectional configuration, i.e. square, round, etc., but in any event the bolts are normally mounted through a metal bushing that protects the takeout arm 32 and/or housing 28' from wear. The torque sensor of this invention is mounted in place of the bushing and it will be recognized that a proper configuration of the sensor effects a direct reading of the brake reaction torque transmitted to the bolts 36,50 by way of the brake housing and torque tube interconnection.

More specifically, and with reference to FIGS. 3, 4, 5, and 6 the torque readout sensor of the invention is shown in a configuration for mounting to a bolt or stud bolt 36,50 having a square or rectangular cross-sectional configuration. The sensor indicated by reference numeral 100 is a metal body preferably of stainless steel having a bore 102 adapted for receiving any of the torque takeout bolts herebefore mentioned. According to this first embodiment, the sensor 100 has wall extensions 104,106 that define the bore 102, the extensions terminating at a flanged end 108. As shown in FIG. 5 the wall extensions 106 have a recessed portion 110 the significance of which will be appreciated hereinafter.

The sensor 100 may be mounted to the brake assemblies of either FIG. 1 or FIG. 2 by either cooling the metal forming the sensor body or heating the housing and force-fitting it into a bore in the brake housing flange 28a or into a bore 52 provided in the brake housing 28'. The end 108 provides a stop upon inserting the sensor in its receiving bore 52. The torque takeout bolts 36,50 are received in the bore 102 of the sensor 100. The exact manner of torque readout will be described with reference to FIG. 6 which is a greatly exploded view, in section, through the sensor wall 106. As hereinbefore mentioned, the walls 106 have recesses 110 which provide a protected mounting place for a pair of strain gauges 112. Further, the walls 106 are formed in a slightly concave configuration having a radius "R" and in this circumstance, a deflection beam is formed of the wall 106 having a deflection "d" as indicated in the drawing. The strain gauges are calibrated to the deflection "d" of the wall 106 and thus are also calibrated to the actual brake reaction torque transmitted to the bolts 36,50 which are housed in the bore 102. A second pair of strain gauges 112' may also be mounted in a recess 110' on the opposite wall 106 so as to provide temperature compensation of the torque readout signal in a conventional manner. It will be appreciated that the shoulders 106a which are provided around the recess 110 prevent damage to the gauges 112 in the event of shock loading on the sensor. Such loading may occur at "touch-down" of the aircraft upon landing.

Turning to FIG. 7, a torque readout sensor 120 is illustrated in a configuration adapted for mounting on a torque bolt 36,50 having a circular cross-section. The sensor 120 is a cylindrical metal body in the form of a flex collar wherein an inner sleeve member 122 has an elliptical bore 122a defined by a major axis $A_M$ and a minor axis $A_m$, the minor axis being equal to the diameter of the torque bolt 36,50 to thus fit tightly on the bolt at that point. An outer sleeve member 124 has a recess 124a that allows for flex motion of the sleeve 122 in the direction of arrow 128. The sensor 120 is mounted in the same manner as the sensor 100 of FIG. 6 in that it is mounted in place of a bushing or the like which is normally used at the torque bolt-brake housing interconnection. Strain gauges 126 are affixed to the outside surface of the inner sleeve 122 in line with the minor axis $A_m$ and in a relative radial position to the recess 124a to sense any deflection of the sleeve by a torque force on the bolt 36,50. Shoulders 124b are provided to protect the strain gauges 126 in the event of shock loading on the sensor.

FIG. 8 illustrates another configuration for the torque readout sensor of the type shown in FIG. 7 except that in this embodiment a sensor 130 is provided in the form of a flex beam. The sensor 130 comprises an inner sleeve 132 that fits tightly about the torque bolt 36,50 and is characterized by at least one axially aligned recess 132a which has an arc length of about 25-50 percent of the circumference of the sleeve 132. An arcuate beam 134 having an arc length slightly greater than the arc length of the recess 132a is mounted in the recess such that the ends 134a abut the walls 132b which are aligned in the axial direction of the sleeve. At least one pair of strain gauges 136 are affixed to an inner surface of the beam 134 and it will now be recognized that when a torque force exists in the direction of arrow 138 on the sleeve 132, compression flexing of the beam 134 is realized in the direction of arrows 140 and an output signal is generated in the strain gauges. The signal may be calibrated to the flexure of the beam 134 and therefore is a direct reading of the applied torque force. Again, the recess 132a is provided with shoulders 132c that protect the strain gauges 136 in the event of shock loading on the sensor.

FIG. 9 illustrates yet another embodiment of the invention which is also adapted for mounting on a circular cross-section torque bolt 36,50. As shown in the drawing, a sensor 150 is in the form of a collar or sleeve 152 having a circular bore 152a that fits tightly about the bolt 36,50 but is characterized by an outer circumference that is substantially elliptical in shape. The ellipse is defined by a major axix $A_M$ and a minor axis $A_m$, the major axis being equal to the diameter of the bore 154 formed in the housing flange 28a or alternatively, in the housing itself 28'. Strain gauges 156 are affixed to the outer surface of the sleeve 152 at the outer extent of the minor axis $A_m$ and it will be appreciated that a torque force exerted on the bolt 36,50 in the direction of arrow 158 will effect deflection of the sleeve and thus an output from the strain gauges that will be a direct indication of the torque force when the gauges are calibrated to the deflection of the sleeve 152. Of course, the readout may also be temperature compensated by the mere installation of strain gauges on the opposite side of the sleeve at the other extent of the minor axis $A_m$. The gauges 156 are protected from shock loads that may occur and which may exceed the normal operating range of the sensor by the provision of shoulders 152b. The shoulders 152b also prevent the sleeve 152 from taking a permanent set outwardly due to such excessive loading on the sensor in the direction of arrow 158.

From the foregoing description it will be readily appreciated by those skilled in the aircraft wheel and brake arts that a torque readout sensor is provided that offers many advantages to the art. For example, the sensor is readily mounted to the brake housingtorque takeout interconnection and this may be accomplised either in a factory installation or in a field retrofit operation. Further, the sensor is readily temperature compensated by the simple expedient of providing an identical configuration of flex collar and strain gauges on the opposite side of the sensor. In this respect, it will also be recognized that either pair of gauges may be utilized to provide the torque readout signal and thus the sensor may be mounted at either end of the torque takeout mechanism of the landing gear.

What is claimed is:

1. A torque readout sensor for mounting to a bolted interconnection between an aircraft brake assembly and a means for limiting brake reaction torque generated upon the application of braking action, said sensor comprising:
    a substantially tubular metallic body having wall portions defining a bore and each of opposite wall portions having a recessed area at the approximate midsection of the body and within the outside surface thereof and at least one of the wall portions formed to a concave configuration in the area of the recess; and
    at least one pair of strain gauges affixed to the wall within the recessed area of the wall portion having the concave configuration;
    said sensor being mounted to the bolt at the interconnection in a manner such that a brake reaction torque force imposed on the bolt deflects the wall portion having the concave configuration and the strain gauges affixed to the recessed area effect an output electrical signal indicative of the torque force experienced at the bolted interconnection.

2. The torque sensor as set forth in claim 1 wherein the wall portions define a substantially square-shaped bore and at least two opposite wall portions thereof have recessed areas and are concave.

3. The torque sensor as set forth in claim 1 wherein the wall portions define a substantially rectangular shaped bore and at least two opposite wall portions thereof have recessed areas and are concave.

4. The torque sensor as set forth in either of claims 2 or 3 wherein pairs of strain guages are mounted in the recessed areas of opposite wall portions, one of the pair effecting a torque readout signal while the other of the pair provides temperature compensation of the signal.

5. The torque readout sensor as set forth in either of claims 2 or 3 wherein the concave wall portions are formed at a radius such as to establish a wall deflection "d" and the strain gauges affixed to the wall portion are calibrated to the deflection.

6. The torque sensor as set forth in either of claims 2 or 3 wherein shoulders are provided around each recessed area to limit wall deflection and protect the strain gauges when excessive shock loads are experienced by the sensor.

7. A torque readout sensor for mounting to a bolted interconnection between an aircraft brake assembly and a means for limiting brake reaction torque generated upon the application of braking action, said sensor comprising:
    a substantially cylindrical metallic body comprising coaxially aligned inner and outer sleeve members, the inner member having a substantially elliptically-shaped bore defined by major and minor axes, said outer sleeve member having at least one recess within its bore in relative position to said minor axis; and
    at least one pair of strain gauges affixed to an outside surface of the inner sleeve in alignment with the minor axis and in relative position to the recess in the outer sleeve bore:

said sensor mounted to a bolt associated with the interconnection between the brake assembly and the torque limiting means, said minor axis of the inner sleeve bore being equal to the diameter of the bolt such that a torque force being exerted on the bolt deflects the inner sleeve outwardly in line with the minor axis, and the strain gauges affixed to the outer surface of the sleeve generate an output signal indicative of the torque force being exerted.

8. The torque sensor as set forth in claim 7 wherein pairs of strain gauges are affixed to opposite outer surfaces of the inner sleeve in line with the minor axis and recesses are provided in the bore of the outer sleeve at the proximate position of the gauges, one pair of gauges providing a torque readout signal while the other pair of gauges provide temperature compensation of the signal.

9. The torque sensor as set forth in claim 7 wherein shoulders are provided in the recess of the outer sleeve proximate the strain gauges to limit the deflection of the inner sleeve and protect the gauges from damage due to shock loads which may be experienced by the sensor.

10. A torque readout sensor for mounting to a bolted interconnection between an aircraft brake assembly and a means for limiting brake reaction torque generated upon the application of braking action, said sensor comprising:

a cylindrical sleeve having at least one axially aligned recess on the outer surface thereof having an arc length equal to about 25-50% of the circumference of the sleeve:

an arcuate beam having an arc length slightly greater than the arc length of the recess and mounted in the recess such that the ends of the beam abutt the walls of the recess in axial alignment with the sleeve; and at least one pair of strain gauges affixed to the inner surface of the beam; said sensor mounted at the bolted interconnection such that a torque force on the bolt within the bore of the sleeve deflects the recessed portion outwardly, the outwardly deflection effecting a compression of the beam and an output signal from the strain gauges indicative of the torque force being applied.

11. A torque sensor as set forth in claim 10 wherein shoulders are provided in the recess of the cylindrical sleeve to limit its deflection and protect the strain gauges when the sensor experiences excessive shock loads.

12. A torque readout sensor for mounting to a bolted interconnection between an aircraft brake assembly and a means for limiting brake reaction torque generated upon the application of braking action, said sensor comprising:

a substantially tubular body having wall portions defining a cylindrical bore and an outer circumference that is substantially elliptical as defined by a major axis and a minor axis; and at least one pair of strain gauges affixed to the body at the outer extend of the minor axis;

said sensor being mounted to the bolted interconnection within a bore of the brake assembly having a diameter equal to the length of the major axis of the body such that a brake reaction torque force imposed on the bolt deflects the wall portion of the body in the direction of the minor axis and the strain gauges affixed to the body effect an output electrical signal indicative of the torque force experienced at the bolted interconnection.

13. The torque readout sensor as set forth in claim 12 wherein a second pair of strain gauges are affixed to the body at the opposite outer extent of the minor axis to provide temperature compensation of the signal.

14. The torque readout sensor as set forth in claim 13 wherein shoulders are provided around the strain gauges to protect the gauges when excessive shock loads are experienced at the bolted interconnection.

* * * * *